United States Patent
Song et al.

(10) Patent No.: US 6,574,677 B1
(45) Date of Patent: Jun. 3, 2003

(54) METHOD FOR USING SMART CARD ON HPC

(75) Inventors: Jeff Song, Taipei (TW); Kuang Shin Lin, Taipei (TW); Xiue Wu Wang, Tianjin (CN); Bin Lo, Tianjin (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/511,728

(22) Filed: Feb. 23, 2000

(51) Int. Cl.[7] .................................................. G06F 3/00
(52) U.S. Cl. .............................. 710/8; 710/12; 710/72; 713/1; 709/301
(58) Field of Search ............................. 710/1, 8, 12, 20, 710/62, 72, 73, 102, 103–106, 13, 64; 709/301, 302, 220; 713/1, 100; 235/380

(56) References Cited

U.S. PATENT DOCUMENTS

| | | | | |
|---|---|---|---|---|
| 5,521,966 A | * | 5/1996 | Friedes et al. ................. 379/91 |
| 5,659,684 A | * | 8/1997 | Giovannoni et al. .......... 709/250 |
| 6,009,333 A | * | 12/1999 | Chaco ........................... 455/456 |
| 6,015,092 A | * | 1/2000 | Postlewaite et al. .......... 235/486 |
| 6,142,369 A | * | 11/2000 | Jonstromer ................... 235/380 |
| 6,185,682 B1 | * | 2/2001 | Tang ............................. 713/168 |
| 6,349,257 B1 | * | 2/2002 | Liu et al. ....................... 701/200 |
| 6,422,460 B1 | * | 7/2002 | Boesch .......................... 235/380 |
| 6,470,284 B1 | * | 10/2002 | Oh et al. ......................... 702/64 |

\* cited by examiner

Primary Examiner—Jeffrey Gaffin
Assistant Examiner—RiJue Mai
(74) Attorney, Agent, or Firm—Birch, Stewart, Kolasch & Birch, LLP

(57) ABSTRACT

This specification discloses a method for using a smart card on an HPC, which, through the combination of the HPC and a smart card reader and a driver, controls the smart card reader. This also provides application programs a public interface for the user to manipulate the smart card reader for data transmission with the HPC.

13 Claims, 4 Drawing Sheets

METHOD FOR USING SMART CARD ON HPC

BACKGROUND OF THE INVENTION

1. Field of Invention

This invention relates to a method for using a smart card and, in particular, to a method for using the smart card on an HPC.

2. Related Art

Under usual circumstances, when several people use the same HPC, the identification of users and data maintenance demand certain safety and security requirements. However, the traditional HPC does not provide devices such as the smart card reader for the safety and security of users on the HPC.

SUMMARY OF THE INVENTION

This invention provides a method for using a smart card on an HPC, which provides a driver for connecting the HPC and the smart card reader, with the manipulation of which data transmission between the HPC and the smart card reader can be implemented.

Another object of the present invention is to provide a public interface through which the user can store personal information on the HPC so as to ensure the safety and security of the user.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given by hereinbelow illustration only, and thus are not limitative of the present invention, and wherein.

DETAILED DESCRIPTION OF THE INVENTION

The instant invention provides the ability of combining an HPC and a smart card reader by providing a driver to enable the manipulation on the smart card reader. This invention also provides a public interface for application programs 105 for the user to use the smart card reader on data transmission. When multiple users perform data inquiries on a public machine, the messages and data on the public machine need to be updated and maintained continuously. First, the manipulation system 104 is started and automatically performs the dynamic link library of the smart card driver. The dynamic link library then searches the smart card reader. If found, the dynamic link library configures the connection method and obtains the status and type of the smart card. The driver completes the connection between the manipulation system and the smart card reader.

After the connection between the manipulation system and the smart card reader, the user can start a data inquiry application, which performs relevant inquiry functions of the driver to check if a smart card has been inserted into the smart card reader. If not, then the user is prompted to insert a proper smart card; otherwise, the user is prompted to enter the identification for using the smart card. After getting the confirmation message, it is to be compared with the identification information obtained from the smart card via the driver. If the comparison indicate an error, then the user is not allowed to access the public machine; otherwise, the user can store data on the smart card into the public machine, perform data inquiry, and write the corresponding message into the smart card.

Figure 1:
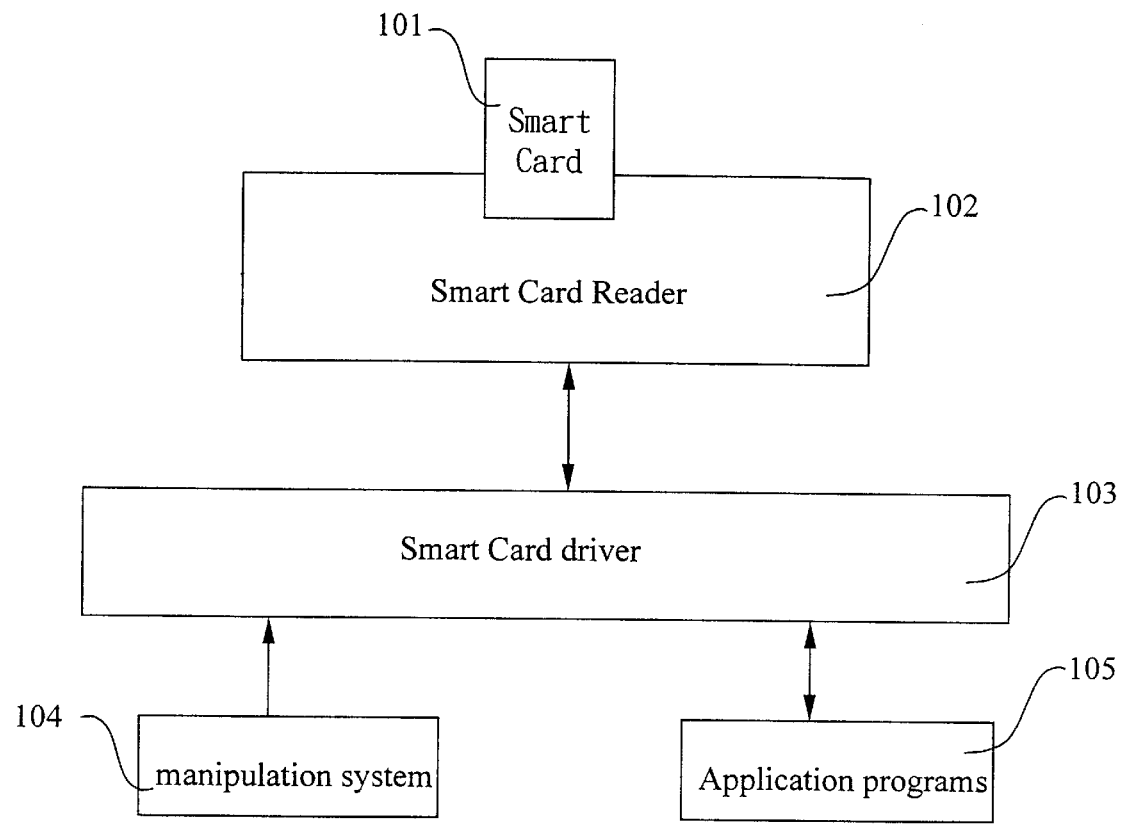
FIG. 1 shows a system structure of the present invention.

FIG. 1 shows a system structure of the present invention. When the user inserts a smart card 101 into a smart card reader 102, a readable and writable device, the smart card reader completes the task of outputting or inputting the user information to the HPC through the execution of the smart card driver 103 in a driver module. The function of the driver module is to configure the communication method and to initialize the communication interface.

Figure 2:
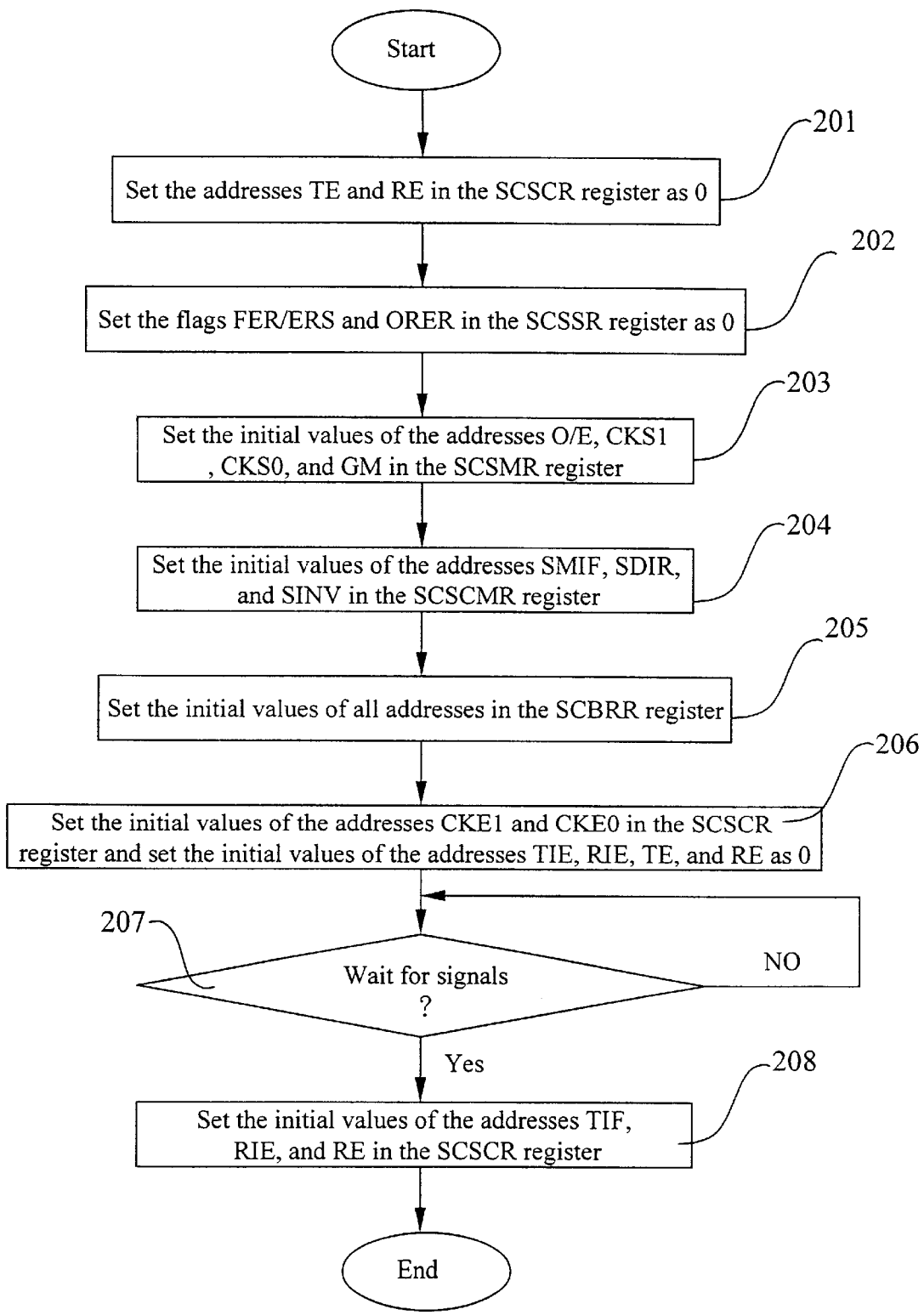
FIG. 2 is a flow chart of initialization of each status register in the smart card of the present invention.
Figure 3:
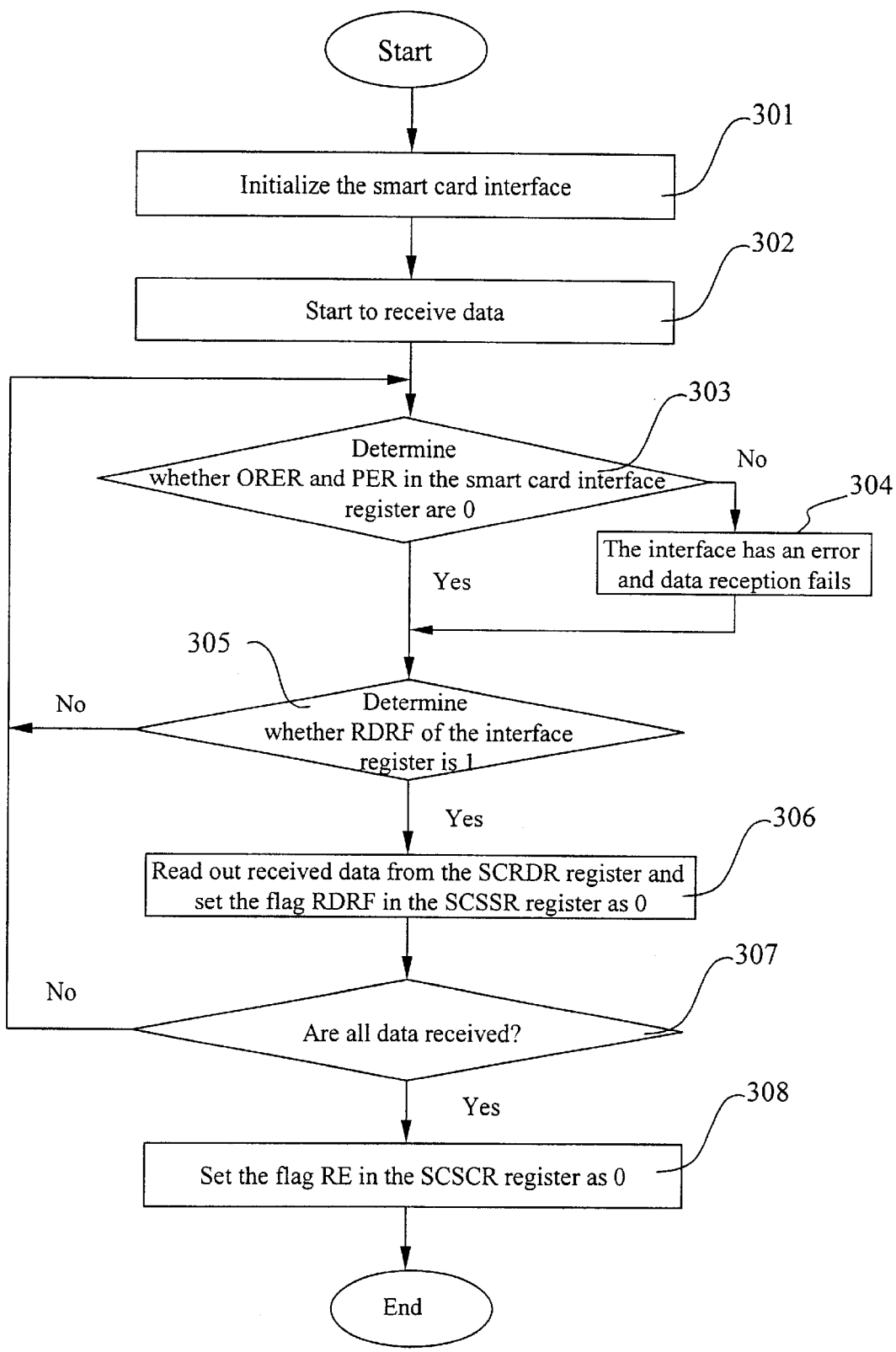
FIG. 3 is a flow chart of data reception of the smart card of the present invention.
Figure 4:
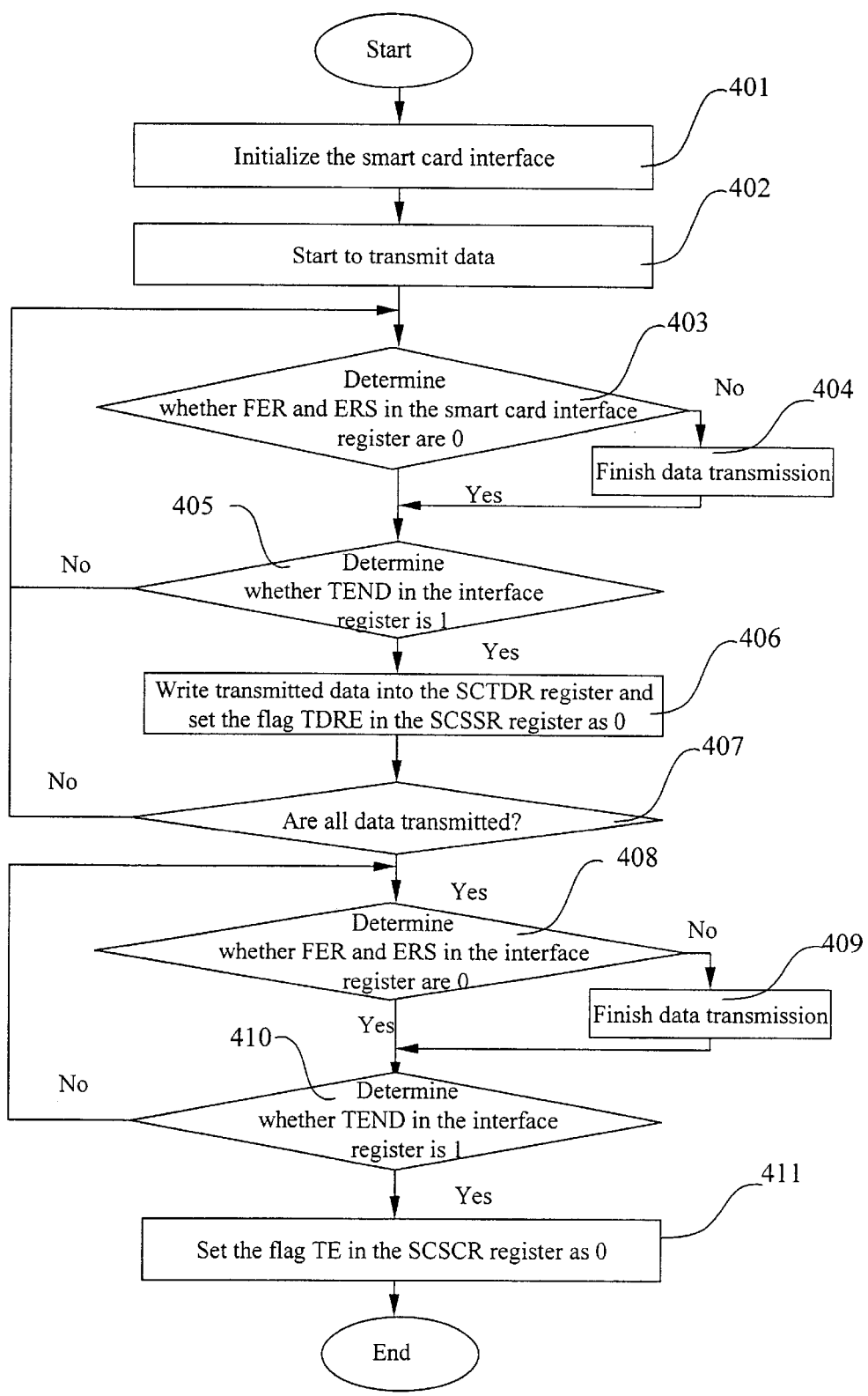
FIG. 4 is a flow chart of data transmission of the smart card of the present invention.

According to this invention, the method comprises three steps: step 1 is the initialization of each status register of the smart card, as shown in FIG. 2; step 2 is data reception of the smart card, as shown in FIG. 3; and step 3 is data transmission of the smart card, as shown in FIG. 4.

Referring to FIG. 2, the procedure flow of initialization of each status register of the smart card is explained as follows. First, clear the addresses TE and RE in the SCSCR register and set them to be 0 (step 201). Then clear the flags FER/ERS and ORER in the SCSSR register and set them as 0 (step 202). Set the initial values of the addresses O/E, CKS1, CKS0, and GM in the SCSMR register (step 203). Then set the initial values of the addresses SMIF, SDIR, and SINV in the SCSCMR register (step 204). Set the initial values of all addresses in the SCBRR register (step 205). Then set the initial values of the addresses CKE1 and CKE0 in the SCSCR register and set the initial values of the addresses TIE, RIE, TE, and RE as 0 (step 206). Wait for signals (step 207). Set the initial values of the addresses TIF, RIE, and RE in the SCSCR register if there is any signal (step 208); otherwise the system keeps waiting until a signal comes.

Referring to FIG. 3, the procedure flow of data reception of the smart card is explained as follows. First, initialize the smart card interface (step 301), and start to receive data (step 302). Determine whether ORER and PER in the smart card interface register are 0 (step 303). If not, the interface has an error and data reception fails (step 304). If both ORER and PER are 0, then determine whether RDRF of the interface register is 1 (step 305). If not, then the system returns to the status of waiting for receiving data. If RDRF is 1, then read out received data from the SCRDR register and set the flag RDRF in the SCSSR register as 0 (step 306). Then determine if all data are received (step 307). If so, then set the flag RE in the SCSCR register as 0 (step 308); otherwise, the system returns to the step of starting to receive new data.

Referring to FIG. 4, the procedure flow of data transmission of the smart card is explained as follows. First, initialize the smart card interface (step 401), and start to transmit data (step 402). Then determine whether FER and ERS in the smart card interface register are 0 (step 403). If not, then the data transmission has an error and the data transmission is halted (step 404). Otherwise, determine whether TEND in the interface register is 1 (step 405). If not, then the system returns to the step of starting to transmit data for new data transmission. Otherwise, write transmitted data into the SCTDR register and set the flag TDRE in the SCSSR register as 0 (step 406). Then determine if all data are transmitted (step 407). If not, then the system returns to the step of starting to transmit data. Otherwise, determine whether FER and ERS in the interface register are 0 (step 408). If not, then an error occurs in the transmission process and the transmission is halted (step 409). Otherwise, determine whether TEND in the interface register is 1 (step 410). If not, then repeat the previous determination step. Otherwise, set the flag TE in the SCSCR register as 0 (step 411).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for using a smart card on an HPC, which method comprises the steps of:
   providing a smart card;
   providing a smart card reader for the insertion of the smart card;
   providing a smart card driver for configuring the communication method and initializing the communication interface, and providing the smart card an interface through the execution of the HPC CPU;
   executing the smart card driver via a manipulation program to implement the operations of data reading and writing; and
   identifying the user identity via an application program and performing data reception and transmission between the smart card and the HPC,
   wherein the step of data reception further comprises the steps of:
   initializing the smart card interface;
   starting to receive the data;
   ensuring that ORER and PER in the smart card interface register are 0;
   ensuring that RDRF of the interface register is 1;
   reading out received data from the SCRDR register and setting the flag RDRF in the SCSSR register as 0;
   ensuring that all the data are received; and
   setting the flag RE in the SCSCR register as 0.

2. The method for using a smart card on an HPC of claim 1, wherein the smart card driver further comprises the initialization steps of:
   setting the address TE and RE in the SCSCR register as 0;
   setting the flags FER/ERS and ORER in the SCSSR register as 0;
   setting the initial values of the addresses O/E, CKS1, CKS0, and GM in the SCSMR register;
   setting the initial values of the addresses SMIF, SDIR, and SINV in the SCSCMR register;
   setting the initial values of all addresses in the SCBRR register;
   setting the initial values of the addresses CKE1 and CKE0 in the SCSCR register and setting the initial values of the addresses TIE, RIE, TE, and RE as 0; and
   waiting for a request signal and setting the initial values of the addresses TIF, RIE, and RE in the SCSCR register.

3. The method for using a smart card on an HPC of claim 1, wherein if the ORER and the PER in the smart card interface register are not 0 then the method further comprises a step of displaying an error message about the data reception.

4. The method for using a smart card on an HPC of claim 1, wherein if the RDRF in the smart card interface register is not 1, then the method further comprises a step of returning to the step of ensuring that ORER and PER in the smart card interface register are 0.

5. The method for using a smart card on an HPC of claim 1, wherein if the data are not completely received, then the method further comprises a step of returning to the step of ensuring that ORER and PER in the smart card interface register are 0.

6. The method for using a smart card on an HPC of claim 1, wherein the step of data transmission further comprises the steps of:
   initializing the smart card interface;
   starting to transmit data;
   ensuring that FER and ERS in the smart card interface register are 0;
   ensuring that TEND in the interface register is 1;
   writing transmitted data into the SCTDR register and setting the flag TDRE in the SCSSR register as 0;
   ensuring that all data are transmitted;
   ensuring that FER and ERS in the interface register are 0;
   ensuring that TEND in the interface register is 1; and
   setting the flag TE in the SCSCR register as 0.

7. A method for using a smart card on an HPC, which method comprises the steps of:
   providing a smart card;
   providing a smart card reader for the insertion of the smart card;
   providing a smart card driver for configuring the communication method and initializing the communication interface, and providing the smart card an interface through the execution of the HPC CPU;
   executing the smart card driver via a manipulation program to implement the operations of data reading and writing; and
   identifying the user identity via an application program and performing data reception and transmission between the smart card and the HPC,
   wherein the step of data transmission further comprises the steps of:
   initializing the smart card interface;
   starting to transmit data;
   ensuring that FER and ERS in the smart card interface register are 0;
   ensuring that TEND in the interface register is 1;
   writing transmitted data into the SCTDR register and setting the flag TDRE in the SCSSR register as 0;
   ensuring that all data are transmitted;
   ensuring that FER and ERS in the interface register are 0;
   ensuring that TEND in the interface register is 1; and
   setting the flag TE in the SCSCR register as 0.

8. The method for using a smart card on an HPC of claim 7, wherein the smart card driver further comprises the initialization steps of:

setting the address TE and RE in the SCSCR register as 0;

setting the flags FER/ERS and ORER in the SCSSR register as 0;

setting the initial values of the addresses O/E, CKS1, CKS0, and GM in the SCSMR register;

setting the initial values of the addresses SMIF, SDIR, and SINV in the SCSCMR register;

setting the initial values of all addresses in the SCBRR register;

setting the initial values of the addresses CKE1 and CKE0 in the SCSCR register and setting the initial values of the addresses TIE, RIE, TE, and RE as 0; and waiting for a request signal and setting the initial values of the addresses TIF, RIE, and RE in the SCSCR register.

9. The method for using a smart card on an HPC of claim 7, wherein if the FER and the ERS in the smart card interface register are not 0, then the method further comprises a step of displaying an error message about the data transmission.

10. The method for using a smart card on an HPC of claim 7, wherein if the TEND in the smart card interface register is not 1, then the method further comprises a step of returning to the step of ensuring that FER and ERS in the smart card interface register are 0.

11. The method for using a smart card on an HPC of claim 7, wherein if the data are not completely transmitted then the method further comprises a step of returning to the step of ensuring that FER and ERS in the smart card interface register are 0.

12. The method for using a smart card on an HPC of claim 7, wherein if the FER and the ERS in the smart card interface register are not 0, then the method further comprises a step of displaying an error message about the data transmission.

13. The method for using a smart card on an HPC of claim 7, wherein if the TEND in the smart card interface register is not 1, then the method further comprises a step of returning to the step of ensuring that FER and ERS in the smart card interface register are 0.

* * * * *